United States Patent
Ketterhagen et al.

(10) Patent No.: US 11,181,081 B2
(45) Date of Patent: Nov. 23, 2021

(54) AIR INTAKE FOR WORK VEHICLE

(71) Applicant: Deere & Company, Moline, IL (US)

(72) Inventors: Timothy L. Ketterhagen, Cedar Falls, IA (US); Benjamin J. Schlesser, Independence, IA (US); Noah F. Homan, Waterloo, IA (US); Paul Thomas Bruss, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/654,548

(22) Filed: Oct. 16, 2019

(65) Prior Publication Data
US 2021/0115884 A1    Apr. 22, 2021

(51) Int. Cl.
*F02M 35/10* (2006.01)
*F02M 35/16* (2006.01)
*F02M 35/08* (2006.01)

(52) U.S. Cl.
CPC ...... *F02M 35/10013* (2013.01); *F02M 35/08* (2013.01); *F02M 35/164* (2013.01)

(58) Field of Classification Search
CPC ........... F02M 35/0216; F02M 35/0226; F02M 35/10013; F02M 35/10262;
(Continued)

(56) References Cited

U.S. PATENT DOCUMENTS

| 9,151,253 B2 | 10/2015 | Bunnell et al. |
| 2014/0150384 A1 * | 6/2014 | Bunnell ............. F02M 35/0226 55/332 |

(Continued)

FOREIGN PATENT DOCUMENTS

| DE | 4205425 A1 * | 5/1993 | ......... F02M 35/1211 |
| EP | 0433923 A1 * | 6/1991 | ....... F02M 35/10013 |

(Continued)

OTHER PUBLICATIONS

English machine translation of description for WO-2011094334-A1 provided by ESPACENET (Year: 2020).*

(Continued)

*Primary Examiner* — Michael A Kessler
(74) *Attorney, Agent, or Firm* — Klintworth & Rozenblat IP LLP

(57) ABSTRACT

An intake tower for a work vehicle has a grille with a front face and a duct defining an internal volume and an air intake. The air intake has a periphery at which the grille is mounted and first and second ends. The first end of the air intake is closer to a region of relative low pressure within the internal volume of the duct than the second end. A partition extending between the first and second ends of the air intake is recessed from the front face of the grille. The partition defines one or more intake openings leading to the internal volume of the duct. The opening(s) or portion thereof define a first flow area at the first end of the air intake and a second flow area at the second end of the air intake. The first flow area is lesser than the second flow area, and the opening(s) or portion thereof defining the first flow area is located nearer the front face of the grille than the opening(s) or portion thereof defining the second flow area.

19 Claims, 12 Drawing Sheets

(58) Field of Classification Search
CPC .............. F02M 35/1216; F02M 35/14; F02M 35/10104; F02M 35/10124; F02M 35/10144; F02M 35/164; B60K 13/02
See application file for complete search history.

(56) References Cited

U.S. PATENT DOCUMENTS

2016/0010604 A1*  1/2016  Zeilenga ............. F02M 35/048
                                                              95/12
2017/0100689 A1*  4/2017  Loken .................... B01D 45/08
2019/0055907 A1    2/2019  Tsuruta et al.

FOREIGN PATENT DOCUMENTS

WO   WO-2011094334 A1 *  8/2011  ........... F02M 35/088
WO        2017086261 A1     5/2017
WO   WO-2017183269 A1 * 10/2017  ............. F02M 35/10

OTHER PUBLICATIONS

English machine translation of description for WO-2017183269-A1 provided by ESPACENET (Year: 2020).*

* cited by examiner

AIR INTAKE FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, and in particular, air intake systems for work vehicles.

BACKGROUND OF THE DISCLOSURE

Certain work vehicles are powered by spark- or compression-ignition internal combustion engines with air intakes that are either charged or naturally-aspirated. Certain such work vehicles may operate in environments containing relatively large quantities of airborne liquid and debris. For example, in the case of agricultural tractors and other agricultural, construction and forestry vehicles, dust, crop matter, rain, irrigation and other dry or liquid media (e.g., nutrients, fertilizers, pesticides, herbicides and the like) may become airborne and, ultimately, may be ingested into the engine air intake. Once ingested, the infiltrating media needs to be separated (removed or filtered) from the intake air. Dry media may become lodged within the air intake or an intermediate pre-cleaner (e.g., vortex or cyclone) or porous filter and accumulate to the point of reducing air flow to the engine, thereby affecting engine performance. Liquid within the air intake can also affect combustion in a manner detrimental to engine performance.

SUMMARY OF THE DISCLOSURE

An air intake tower for a work vehicle is disclosed which has certain improved aspects as compared to conventional air intakes in terms of its flow velocity profile and/or debris and liquid penetration into the tower.

In one aspect the disclosure provides an intake tower for a work vehicle having a grille with a front face and a duct defining an internal volume and an air intake with a periphery at which the grille is mounted. The air intake has a first end and a second end, the first end being closer to a region of relative low pressure within the internal volume of the duct than the second end. A partition extends between the first and second ends of the air intake recessed from the front face of the grille. The partition defines one or more intake openings leading to the internal volume of the duct. The one or more openings, or portion of the one or more openings, define a first flow area at the first end of the air intake, and the one or more openings, or portion of the one or more openings, define a second flow area at the second end of the air intake. The first flow area is lesser than the second flow area. The one or more openings, or portion of the one or more openings, defining the first flow area is/are located nearer the front face of the grille than the one or more openings, or portion of the one or more openings, defining the second flow area.

In another aspect the disclosure provides an intake tower for a work vehicle having a grille with a front face and a duct defining an internal volume and an air intake having a periphery at which the grille is mounted. The air intake has a lower end and an upper end, the lower end being closer to a region of relative low pressure within the internal volume of the duct than the upper end. A partition extends between the lower and upper ends of the air intake recessed from the front face of the grille. The partition defines one or more intake openings leading to the internal volume of the duct. The one or more openings, or portion of the one or more openings, define a lower flow area at the lower end of the air intake and the one or more openings, or portion of the one or more openings, define an upper flow area at the upper end of the air intake. The lower flow area is lesser than the upper flow area. The one or more openings, or portion of the one or more openings, defining the lower flow area is/are located nearer the front face of the grille than the one or more openings, or portion of the one or more openings, defining the upper flow area.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
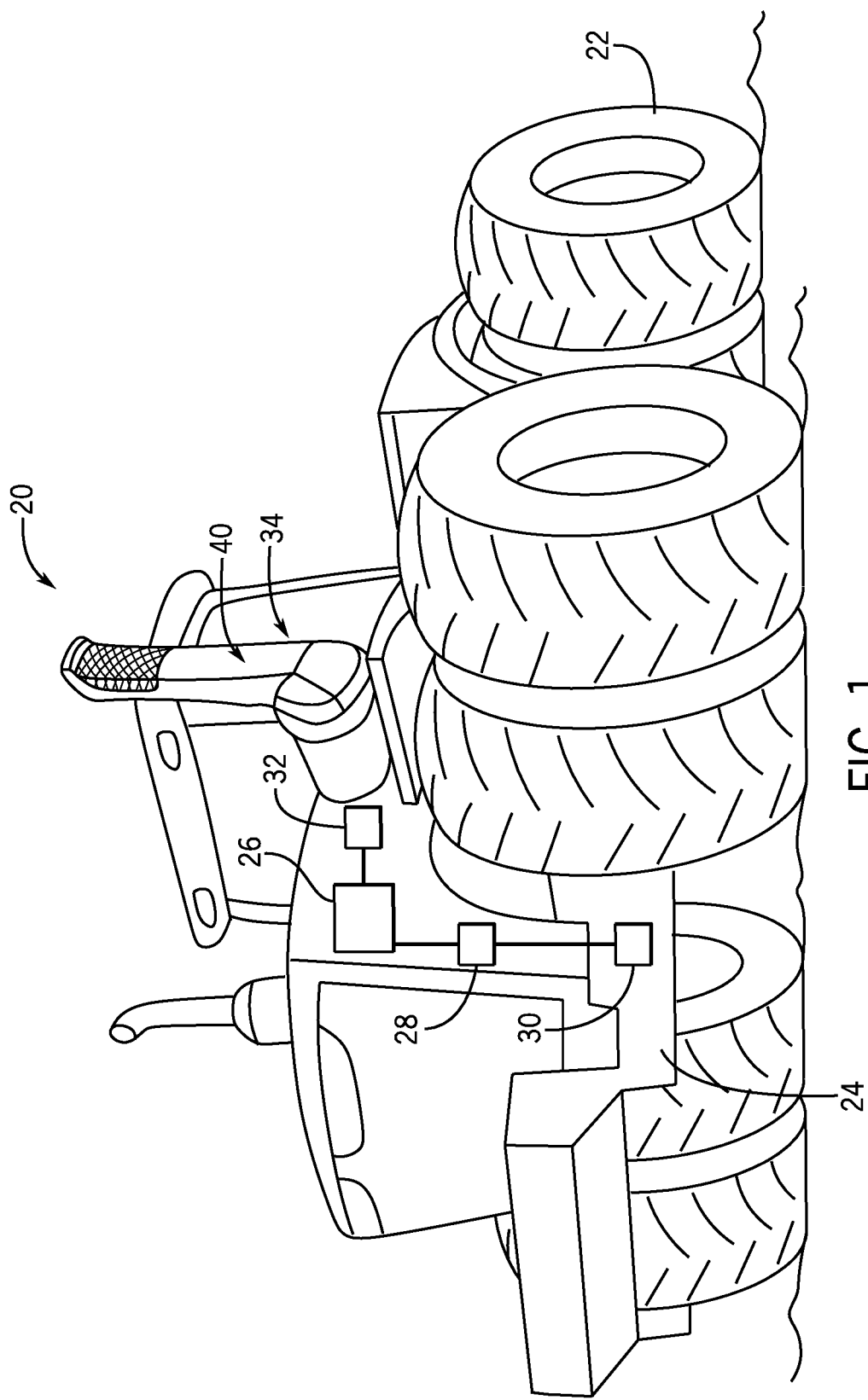
FIG. 1 is a simplified perspective view of an example work vehicle in the form of an agricultural tractor equipped with an air intake tower in accordance with the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments

Overview

The following describes engine air intakes, such as air intake towers for work vehicles of various types used in the agriculture, construction, forestry and other industries. The air intake towers function to provide clean air to a charged (e.g., super- or turbo-charged) or naturally-aspirated spark- or compression-ignition internal combustion engine (e.g., diesel engine). The air intake towers are configured to effect a generally uniformly distributed flow velocity across a porous outer grille element of the air intake tower. The term "screen velocity" is used herein to refer to the velocity of air passing through openings in the outer grille element of the air intake tower. The profile or distribution of the screen velocity thus pertains to the profile or distribution at the outer element of the air intake tower, either at a front face, sides or both the front and sides of the outer element. It will be understood that the terms "grille" and "screen velocity" are inclusive, without limitation, of porous elements of various constructions, including mesh screens, perforated metal sheets and molded perforated resin panels. The term "air intake tower" is also used herein to refer to an external component of a vehicle, typically configured and mounted in a generally upright orientation relative to the work vehicle platform (e.g., chassis). The term "tower" is inclusive of various configurations other than shown in the figures and described below and does not imply a certain length or height relative to the vehicle or ground.

The disclosed air intake tower is configured in various embodiments to effect a generally uniform screen velocity upstream in the direction of air through the air intake throughout the length and width of one or more intake openings through which ambient air passes into the air intake. This is accomplished in part by recessing the intake opening or openings back from the outer grille element in the direction of air flow. The intake opening or openings are recessed to provide a relatively large volume of space between the intake opening or openings and the grille. Additionally, the intake opening or openings are configured so that they create a reduced flow area nearest to a region of relative low pressure within the internal volume of the air intake tower. The reduced flow area may be the flow area through a single intake opening or an aggregate flow area through multiple intake openings. The reduced flow area is also located along the air intake at the nearest pathway, or not further than the nearest pathway, for air to travel from the grille to the intake opening or openings. For example, the reduced flow area may be located at an end of the air intake nearest another downstream (in the direction of air flow) component of the engine air system (e.g., an air cleaner intermediate the air intake tower and the engine). The reduced flow area may also be located nearest the grille and thus at a location of the shortest path for air to travel from the grille to the intake opening or openings.

The foregoing structural parameters may be achieved with the air intake taking various configurations. For example, the air intake tower may include an air intake formed by a partition recessed from the grille in one or more directions, such as back from a front face of the grille. The partition may be formed by a single wall or a wall assembly and define a single intake opening. The single intake opening may be a generally four-sided opening with angled sides that taper inward toward the region of low pressure within the air intake tower, for example, toward the lower end of the air intake. With the tapered side walls of the single intake opening being the same length, the partition would then define an upper end wall of the single intake opening that is longer in the side-to-side dimension than a lower end wall of the single intake opening, such that the side walls of the single intake opening diverge in the direction of the upper end. As such, the narrower lower end of the single intake opening would define the reduced area region. Furthermore, the partition may be recessed from the grille uniformly throughout its length or differently at different locations of its length. In some configurations, for example, the partition may be recessed in a curved-, planar-, angled- or step-fashion from the grille farther near the wider end of the single intake opening, in which case the reduced flow area region at the lower end of the single intake opening would be closer to the front face of the grille than the upper end.

In other configurations, the air intake tower may include an air intake formed by a recessed partition or partition assembly that defines multiple intake openings with discrete open areas that are spaced apart throughout the length and/or width of the air intake. For example, the partition may define multiple openings of the same or different sizes and shapes that are spaced apart equally or differently along the length (in the upright orientation) of the air intake. The multiple intake openings may define the reduced flow area region by one opening or an aggregate of openings defining a relatively lesser flow area at an end of the air intake nearest the region of low pressure within the air intake tower. This may be achieved by one or more intake openings specifically configured to be smaller in opening size than other intake openings of the air intake, or by one or more intake openings specifically configured to be larger in opening size than the other intake openings. In one example, the air intake includes multiple intake openings that are the same opening size spaced apart substantially equally along the length of the air intake and one larger intake opening at an end (e.g., the upper end) of the air intake opposite the end (e.g., the lower end) nearest the region of low pressure within the air intake tower in which case the one larger intake opening would provide a primary flow area through which more air flow would be drawn than individual other intake openings, such as a single intake opening, or collective subset of intake openings, nearest the low pressure region. The primary flow area may also be established by a collective subset of intake openings and may constitute a majority of the available flow area through the partition, or a significant but minority percentage thereof, sufficient to achieve a reduced flow area region at the end of the air intake nearest the low pressure region. Further, in an air intake with multiple intake openings, the partition may be recessed from the grille uniformly throughout its length or differently at different locations of its length. In some configurations, like the foregoing example, the partition may be recessed from the grille farther at the upper end with the primary flow area than at the lower end of the air intake so that the reduced flow area region would be closer to the front face of the grille than the upper end defining the primary flow area.

The various configurations of the air intake tower, such as described in the foregoing examples, facilitate a generally evenly distributed screen velocity. An even screen velocity profile serves to inhibit, prevent or reduce, ingestion of debris and liquid into the air intake, and, in turn, into upstream components of the engine air system, and ultimately the engine itself. In the case of liquid, this serves to inhibit certain combustion abnormalities and pooling of liquid in component housings and dampening of components such as filters and the like. In the case of dry debris, this serves to inhibit accumulation of debris and eventual clogging of filters within the air system and the grille of the air intake tower.

In various configurations, the air intake tower may have one or more features that aid in physically impeding the infiltration of liquid and debris into the engine air system and/or the air intake tower itself. For example, the partition may include one or more features configured to shield the intake opening(s) from incoming liquid and debris and tend to reduce or inhibit liquid and debris from passing into the intake opening(s). In some configurations, the air intake may have one or more raised surfaces or projections such that the one or more intake openings are arranged so that incoming liquid and debris would physically contact the raised surfaces or projections rather than flow into the intake openings. In some configurations, such raised surfaces and projections take the form of one or more protuberances or louvers spaced apart one above another. Multiple protuberances, defining multiple intake openings, may be the same or different sizes and shapes and may lie in a common upright plane such that they are recessed back the same distance from the grille (e.g., the front face of the grille) or may be staggered in the flow direction, such as progressively recessed back further from the front face of the grille from the lower end to the upper end of the air intake. In some configurations, raised surfaces or projections may extend along the perimeter or periphery of the intake opening or openings and be configured as curved or at a straight angle to physically shed liquid and debris outwardly away from the intake opening(s). The air intake tower may also have a drain opening at a collection area that is fed passively by air pressure and/or gravity and drained passively by air pressure and/or gravity.

The air intake may have various other features for liquid and debris mitigation or other purposes. For example, the partition may have raised surfaces or projections configured to ease the transition of external air flow through the intake opening(s) to reduce the pressure drop across the partition, which could otherwise have an adverse impact on the screen velocity profile, and thereby on liquid and debris ingestion though the air intake.

Additional description of example air intake towers for work vehicles will now be discussed in connection with FIGS. 1-14. While examples of the air intake tower are described below in the context of a particular type of work vehicle (namely, an agricultural tractor), embodiments of the air intake tower can be utilized onboard numerous different types of work vehicles. In this regard, embodiments of the air intake tower may be beneficially integrated into any work vehicle routinely operated in off-road applications in environments containing relatively large amounts of airborne liquid and debris. A non-exhaustive list of work vehicles into which embodiments of the air intake tower may be usefully integrated includes other types of agricultural equipment, such as various self-propelled loaders, harvesters, sprayers, windrowers and mowers; forestry work vehicles, such as skidders and feller bunchers; and construction work vehicles including loaders, crawler dozers, excavators, and motor graders.

Work Vehicle Equipped with Example Air Intake Towers

FIG. 1 schematically depicts an agricultural tractor 20 that includes a plurality of ground-engaging wheels 22 supporting a chassis 24 off the ground. The chassis 24 carries a source of propulsion, which may be any suitable charged or naturally-aspirated spark- or compression-ignition internal combustion engine 26. The engine 26 supplies power to a transmission 28, which transfers power from the engine 26 to a suitable driveline 30 coupled to one or more of the wheels 22 to enable the tractor 20 to move. In one example, the engine 26 is a diesel engine that is controlled by an engine control module 32. It should be noted that the source of propulsion can also include various fuel cells, electric motors, hybrid-electric motors, hydraulic motors, etc. The engine 26 is aspirated by an engine air intake system 34, which includes an air intake tower 40 mounted to a side of the tractor 20 at an air intake- or supply-side of the engine 26.

Figure 2:
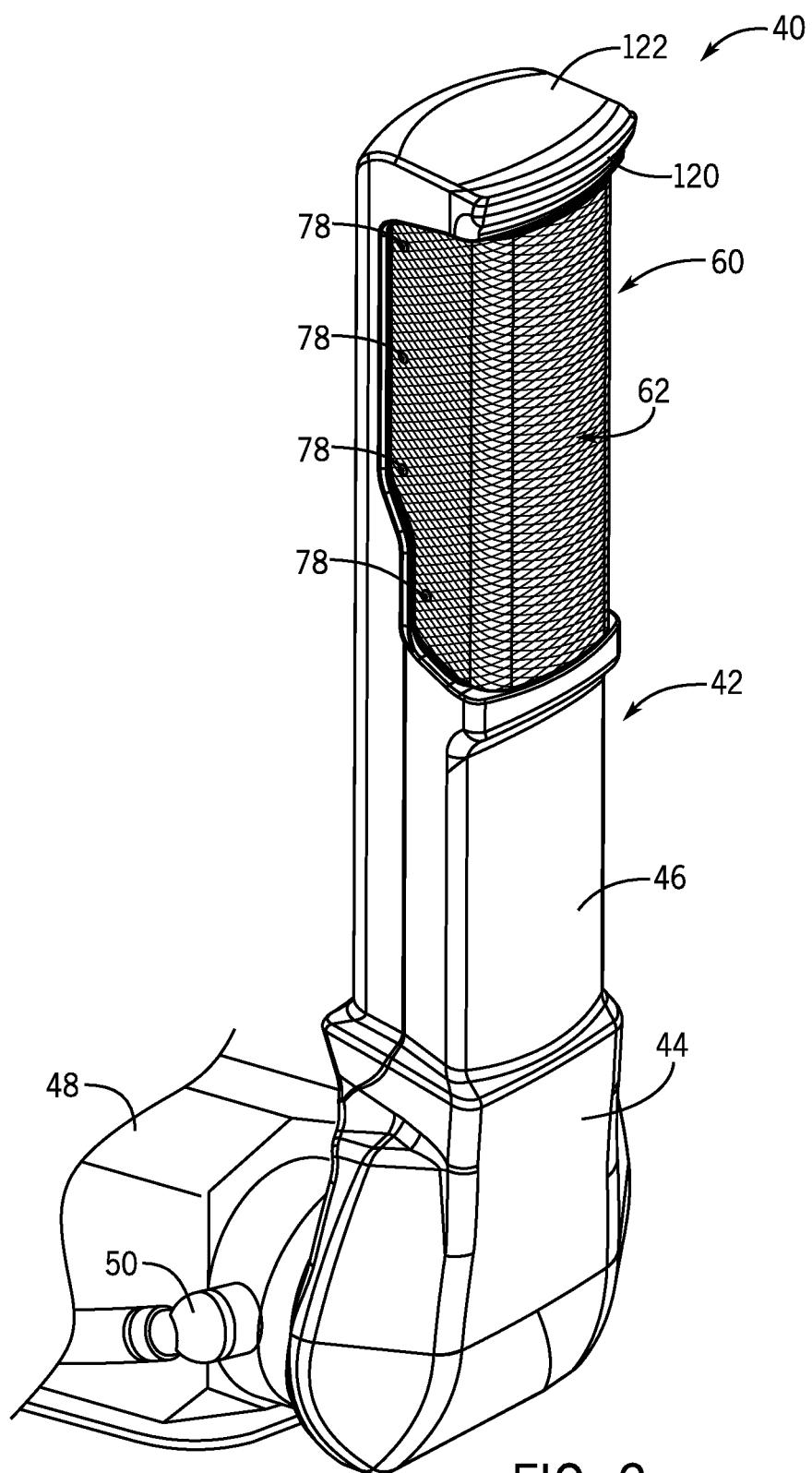
FIG. 2 is a partial perspective view of an example embodiment of the air intake tower shown in isolation.
Figure 3:
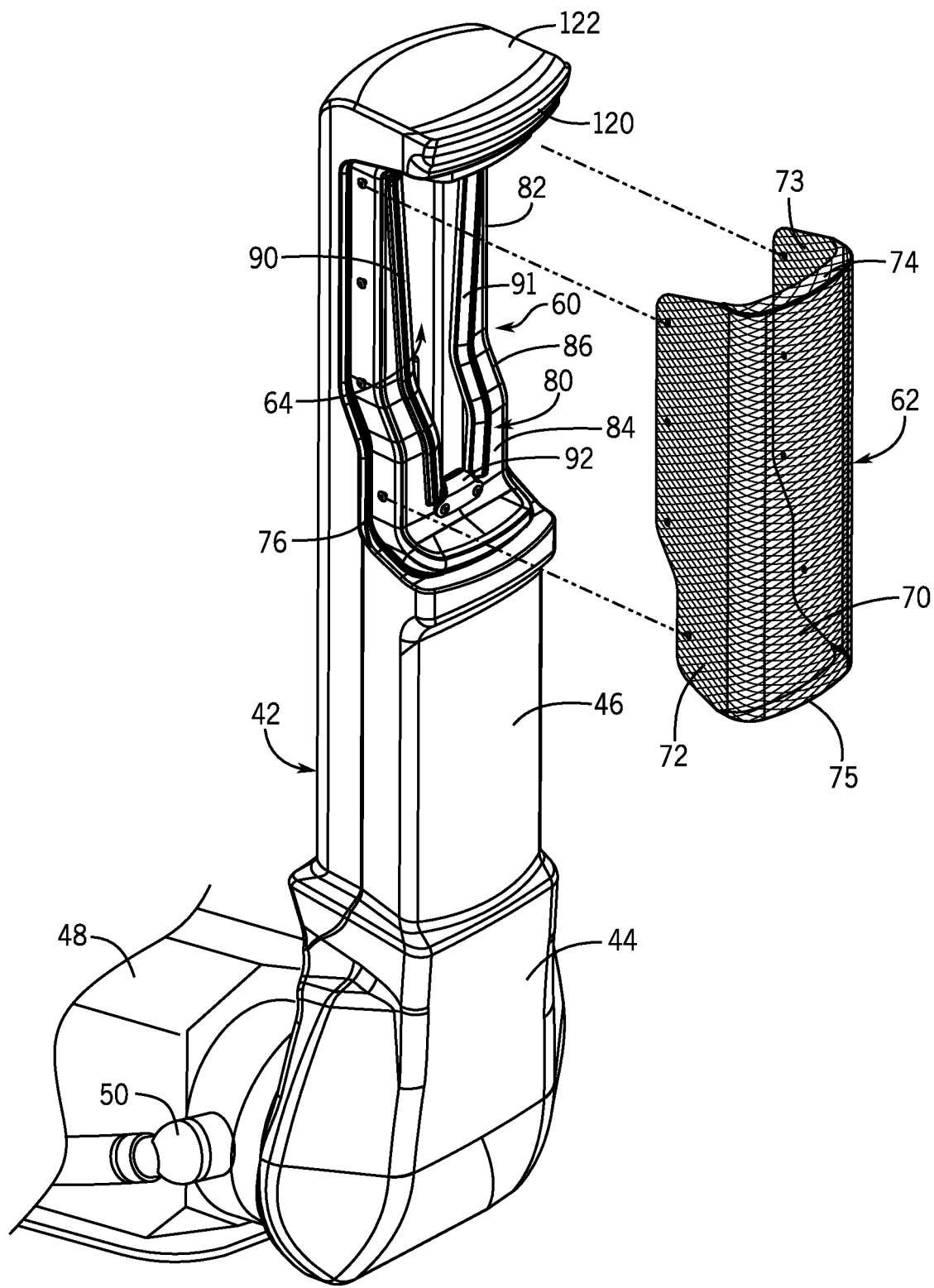
FIG. 3 is the partial assembly view thereof with a grille shown exploded.
Figure 4:
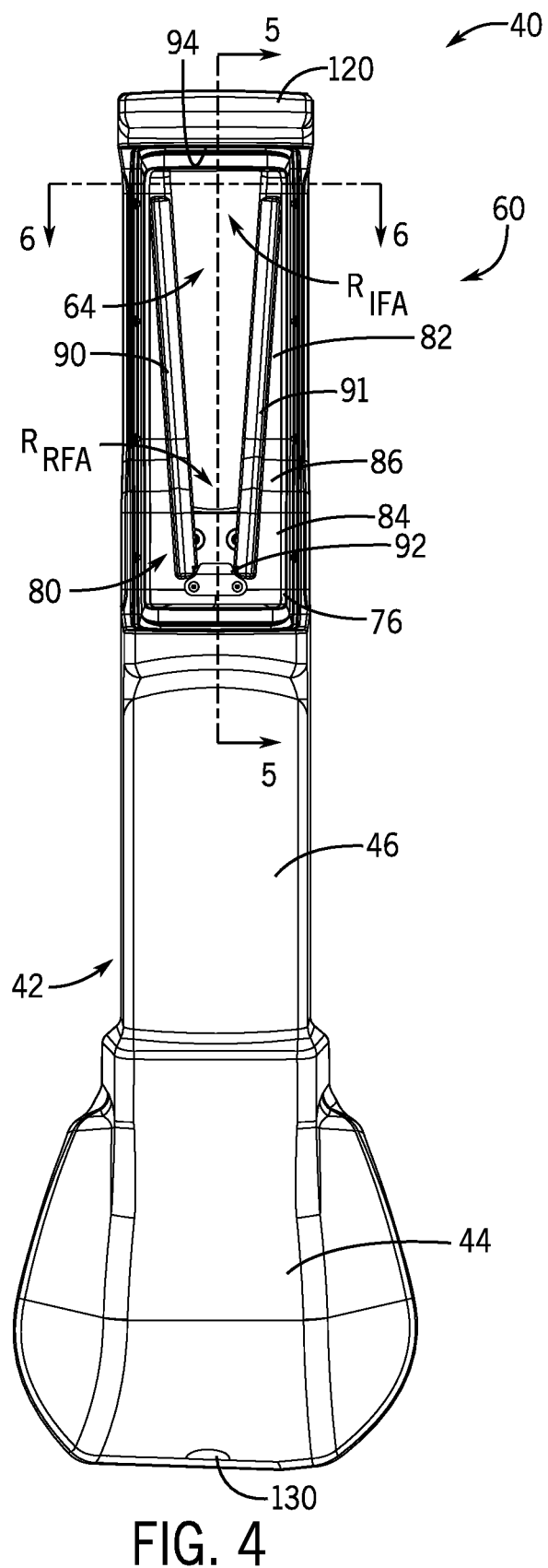
FIG. 4 is a front view thereof with the grille removed.

Referring to FIGS. 2-4, the air intake tower 40 has an elongated housing 42 defining an internal volume 43 (see FIG. 5) with a lower end 44 that is widened and flattened as it transitions from the main duct 46 of the housing 42 that has a generally square or rectangular cross-section to an outlet opening (not shown) that has a circular cross-section generally at a right-angle (perpendicular) to the cross-section of the main duct 46. The outlet opening of the lower end of the housing 42 is mated with an inlet opening (not shown) of an air cleaner 48, which is part of the engine air intake system 34 and communicates with an air inlet to the engine 26 (e.g., a suitable air intake manifold or the like). The air cleaner 48 may be any suitable dry or wet (e.g., oil bath) air cleaner or pre-cleaner having one or more filter elements (not shown) of various constructions (e.g., conical or cylindrical elements of cellulosic or steel mesh material). One or more bypass conduits 50 may be coupled to the housing 42 or the air cleaner 48 (upstream or downstream from the filter element(s)) to divert intake air for other vehicle purposes related or unrelated to the engine 26 (e.g., cooling, debris management, etc.). The air intake tower 40 is mounted to the air cleaner 48, which may take a lateral posture extending out from the engine compartment to a lateral side of the work vehicle 20 generally transverse to the direction of travel. The air intake tower 40 may take an upright posture extending generally vertically up from the engine compartment at a side of the work vehicle 20 with a distal end terminating near or above an upper part (e.g., roof of an operator cab) of the work vehicle 20.

The upper end of the main duct 46 of the housing 42 defines an air intake 60 including a grille 62 situated upstream from one or more intake openings, such as a single intake opening 64. The grille 62 may be of any suitable configuration and construction to mount to the housing 42 and cover the intake opening 64. In the illustrated example, the grille 62 is of molded resin construction having a generally U-shaped configuration defining a slightly bowed front face 70 flanked by inwardly (or downstream) extending opposite straight side walls 72, 73 and small angled top and bottom end walls 74, 75. Other configurations and constructions may include, without limitation, flat, two-dimensional or three-dimensional rectilinear, convex or concave structures of symmetric or asymmetric length and width made of various mesh screens with or without supporting framework or resin or metal panels with perforations, slits, or other narrow open areas that permit ambient air intake while tending to inhibit ingress of particulate debris. Various molding, fabrication and additive manufacturing processes may be used to make the grille 62, the housing 42 or both. Various mechanical fasteners may be used to secure the grille 62 to the housing 42 permanently or removably, including, without limitation, various adhesives, screws, bolts, and rivets. Other joining or bonding techniques may be used according to the materials used for the grille 62 and the housing 42, such as welding, brazing and ultrasonic welding. It is also possible for the grille 62 to be formed as a unitary part of the housing 42, for example, using a molding or additive manufacturing process, with the openings in the grille 62 formed simultaneously or subsequently (e.g., via machining) relative to the rest of the grille 62 or housing 42. As shown in FIGS. 2 and 3, in the illustrated example, the grille 62 is separate from the housing 42 and fit into a recessed peripheral area 76 of the air intake 60 where it is secured to the housing 42 by a plurality of rivets 78 spaced along and through the side walls 72, 73.

In the example illustrated in FIGS. 2-4, the intake opening 64 is defined by a partition 80 that is generally parallel with, and recessed in the direction of air flow (i.e., downstream or outside to inside) from, the front face 70 of the grille 62. The intake opening 64 is also recessed in the air flow direction from the side walls 72, 73 despite the partition 80 itself extending to, and possibly even abutting, the side walls 72, 73. The partition 80 in the illustrated example is a unitary part of the housing 42 and thus formed of the same material and manufacturing process; however, the partition 80 may be a separate part assembled to the housing 42 by any of the foregoing or other fastening devices or techniques. The partition 80 has an upper region 82 that is stepped back from a lower region 84, with an angled transition region 86 therebetween, such that the upper region 82 is recessed or spaced farther from the front face 70 of the grille 62.

Figure 5:
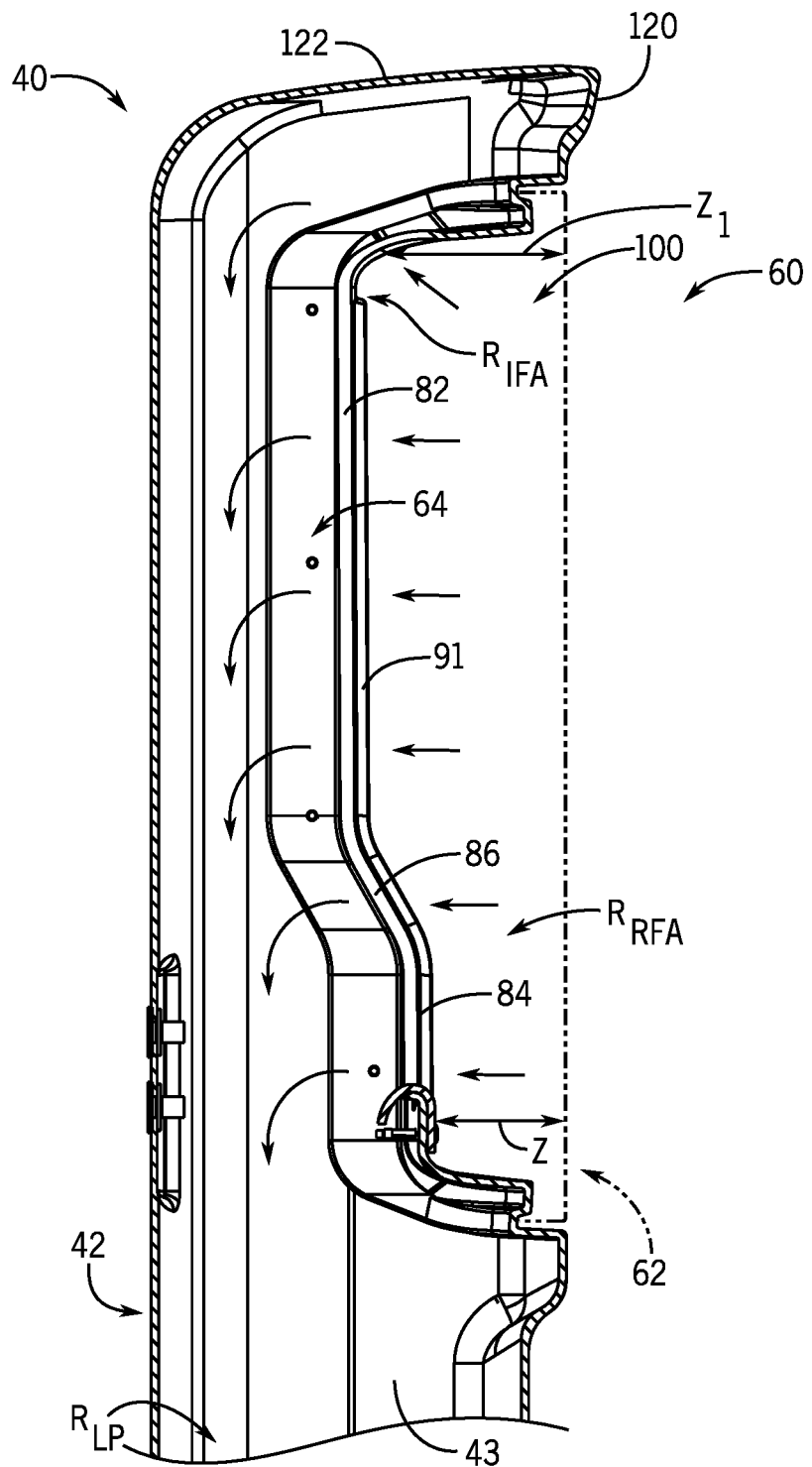
FIG. 5 is an enlarged partial sectional side view thereof take along plane 5-5 of FIG. 4.

The intake opening 64 a single, continuous three-dimensional opening in that it has a periphery defined in terms of length (or height), width and depth, by virtue of the stepped configuration of the partition 80. More specifically, in front elevational view as shown in FIG. 4, the intake opening 64 has a V-shape with two lengthwise side walls 90, 91 that taper or diverge progressively and continuously (i.e., along a consistent slope) outward from bottom to top. In the illustrated example, the side walls 90, 91 do not meet at the bottom but are spaced apart at a lower end wall 92 by a side-to-side dimension X, and the side walls 90, 91 are spaced apart at the top at an upper end wall 94 by a side-to-side dimension $X_1$, in which $X_1>X$ by a ratio of about 1.5:1. As shown in FIG. 5, due to the stepped configuration of the partition 80, the upper end wall 94 is recessed or spaced farther from the front face 70 of the grille 62, at a front-to-back dimension $Z_1$, than is the lower end wall 92, which is spaced from the front face 70 of the grille 62 by a front-to-back dimension Z, in which $Z_1>Z$ by a ratio of about 2:1. Of course, the absolute and relative spacing of the side walls 90, 91, as well as the slopes by which they taper, and the recess spacing of the lower 92 and upper 94 end walls may vary from that in the illustrated example.

The configuration of the intake opening 64 creates a region of reduced flow area $R_{RFA}$ at the narrow lower end of the intake opening 64 as compared to the other (e.g., middle or upper) regions of the intake opening 64. Being at the lower end of the air intake 60 and situated physically closer to the air cleaner 48 and thus to a region of relative low pressure $R_{LP}$ within the engine air intake system 34 generally, and the internal volume 43 of the housing 42 of the air intake tower 40 specifically, the region of reduced flow area $R_{RFA}$ through the intake opening 64 is closer to the region of relative low pressure $R_{LP}$ in the path of air entering the intake opening 64 through the grille 62. Moreover, since the partition 80 is stepped so that the lower end wall 92 is nearer the front face 70 of the grille 62 than the upper end wall 94, the region of reduced flow area $R_{RFA}$ is also upstream from the rest of the intake opening 64 defined by the transition 86 and upper 82 regions of the partition 80, which define a region of increased flow area $R_{IFA}$.

This configuration tends to impart at least two characteristics to the air intake 60. First, the farther setback from the front face 70 of the grille 62 of the region of increased flow area $R_{IFA}$ creates an internal chamber 100 for a relatively large volume of air between (in the flow direction) the grille 62 and the intake opening 64. Second, the region of reduced flow area $R_{RFA}$, again which is nearer the region of relative low pressure $R_{LP}$, and thus the shortest path, and otherwise the path of least resistance, through the air intake tower 40, causes a partial bottle-neck tending to inhibit some of the air from taking the shortest path but instead causing some of the air to flow to the internal chamber 100 from where the air flows into the intake opening 64 through the region of increased flow area $R_{IFA}$. As discussed in more detail below, these characteristics allow the intake opening 64 to have a generally uniform air distribution profile (i.e., uniform screen velocity) through the grille 62. By uniformly distributing air flow through the grille 62, the air intake 60 mitigates or avoids significant regions of relatively high screen velocity that would tend to cause ingress of unwanted liquid or debris into the engine air intake system 34. In the case of particulate matter, uniform screen velocity may also reduce or eliminate build-up of debris, and possibly clogging of openings, at associated areas of the grille 62, and thereby prevent the reduction of air flow to the engine 26.

The configuration of the air intake 60 and the grille 62 allows for ambient air to enter the engine air intake system 34 from multiple sides of the air intake tower 40, in particular, three sides, namely, the front and opposite sides of the air intake tower 40. As detailed further below, the recessed intake opening 60, as well as the dynamics of the air flow, cause the air passing through the side walls 72, 73 of the grille 62 to flow into the volume of the internal chamber 100 behind the grille 62 where it mixes with air flowing through the front face 70 of the grille 62. While the screen velocity profile may be generally consistent or similar at the side walls 72, 73 of the grille 62, even if not, the net screen velocity profile tends to distribute the air flow uniformly throughout the length (or height) and width of the intake opening 64 so as to inhibit concentrated areas of relatively high velocity.

As shown in FIG. 1, and mentioned briefly above, the air intake tower 40 may be situated in an upright orientation at one side of the work vehicle 20. In this mounting position, the front face 70 of the grille 62, and thereby the mouth of the intake opening 64, faces laterally outward from a lateral side (e.g., the left side of the work vehicle 20 from the perspective of a forward-facing operator in the operator cabin), and the side walls 72, 73 face forward and rearward with respect to the work vehicle 20, and thus also the forward travel direction of the work vehicle 20. It should be noted that the air intake tower 40 could be mounted in other orientations or locations relative to the work vehicle 20 or travel direction, and the air intake 60 could be oriented differently such that the front face 70 of the grille 62, and the mouth of the intake opening 64, is at a different side of the housing 42.

Figure 6:
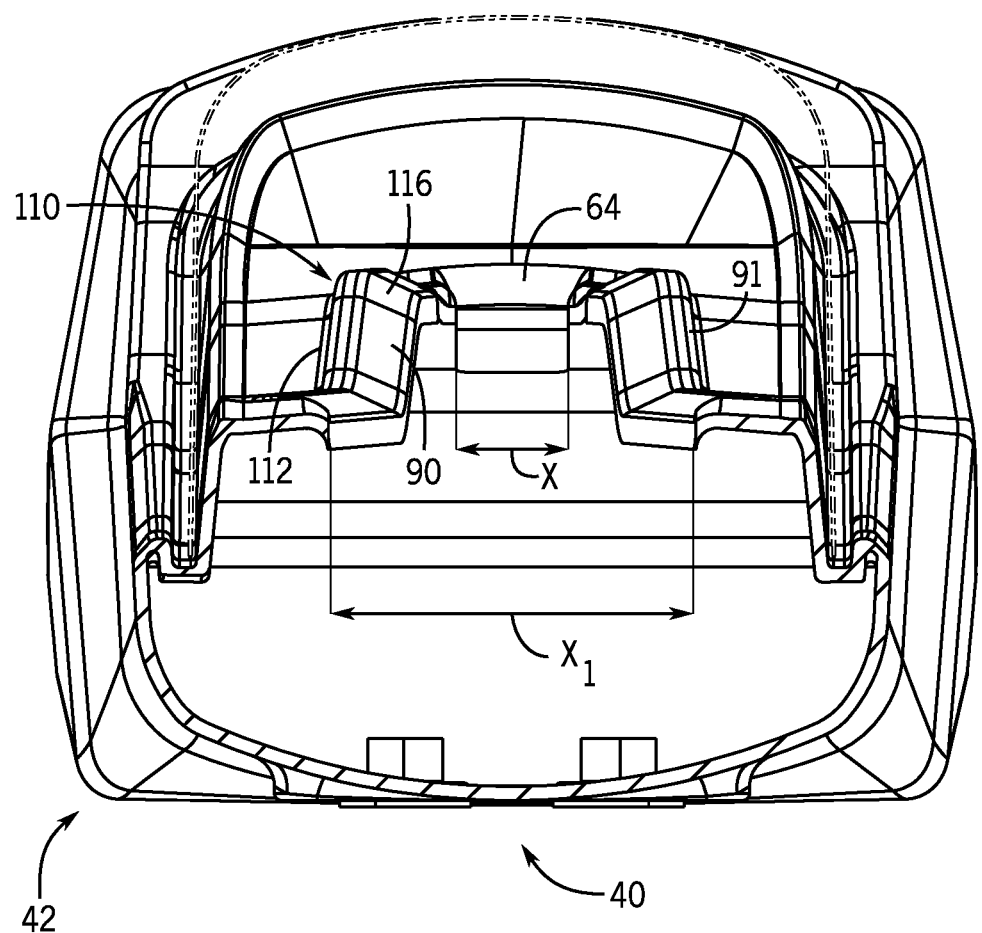
FIG. 6 is a sectional view take along plane 6-6 of FIG. 4.
Figure 7:
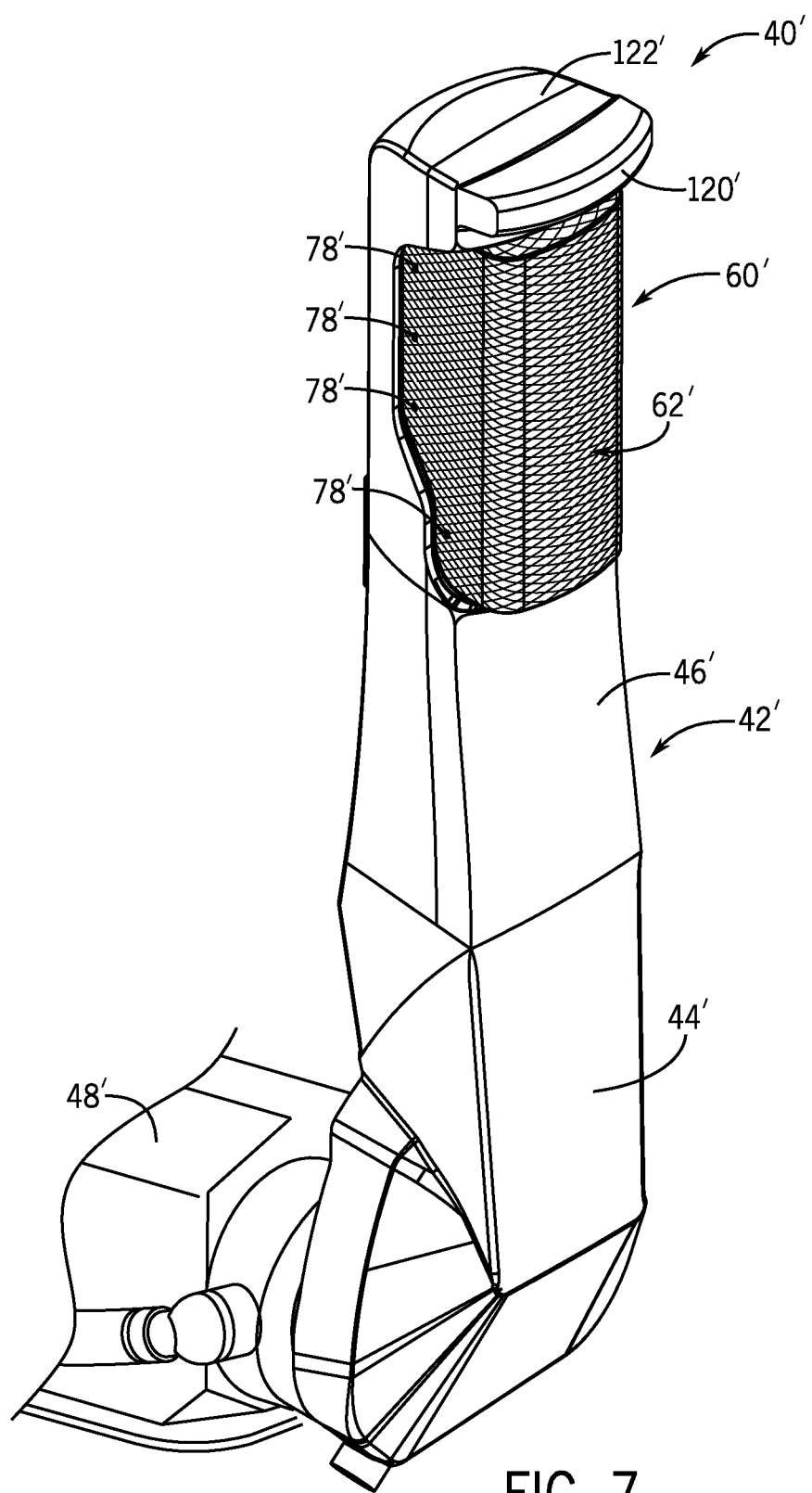
FIG. 7 is a partial perspective view of another example embodiment of the air intake tower shown in isolation.
Figure 8:
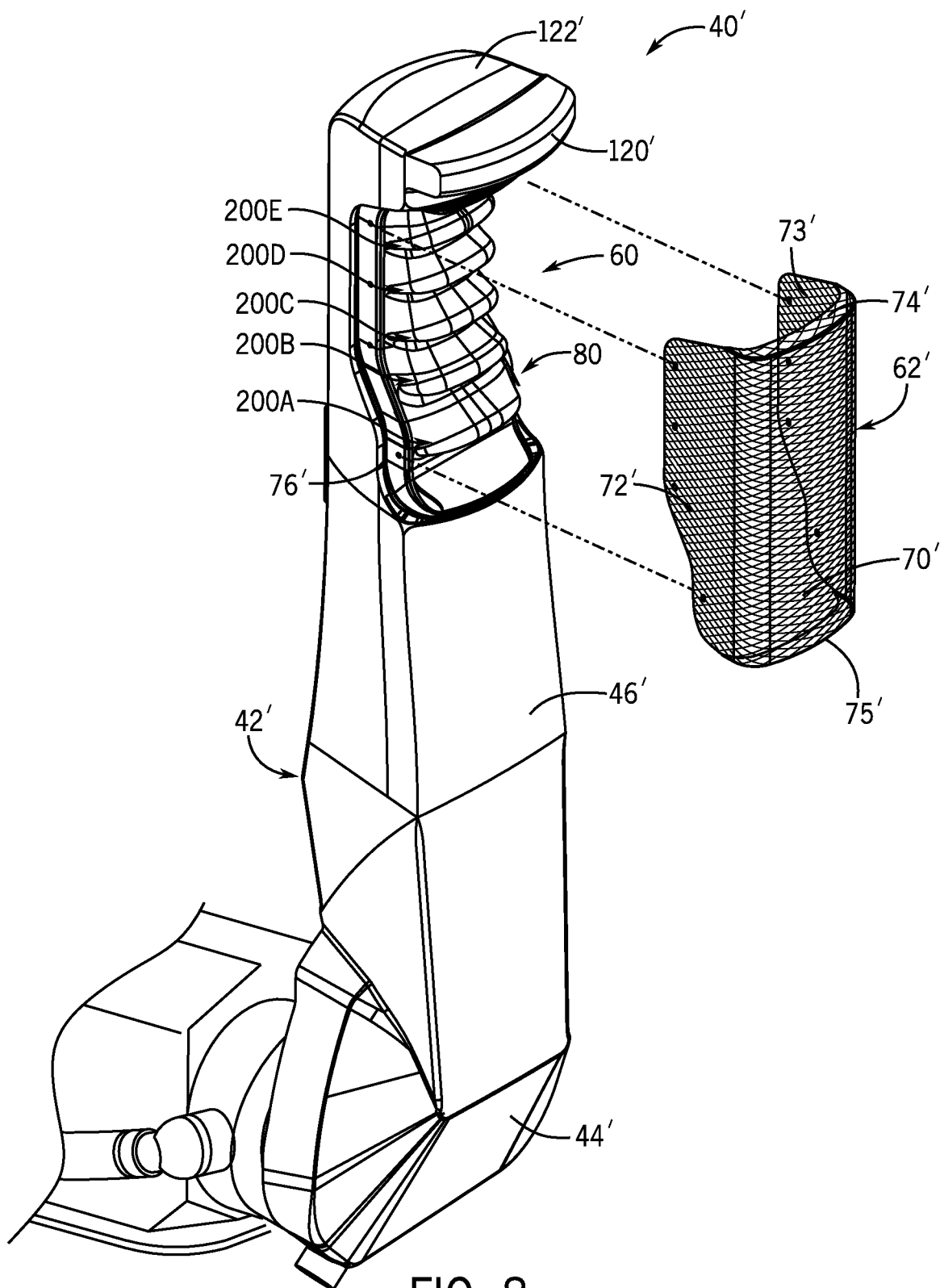
FIG. 8 is the partial assembly view thereof with a grille shown exploded.
Figure 9:
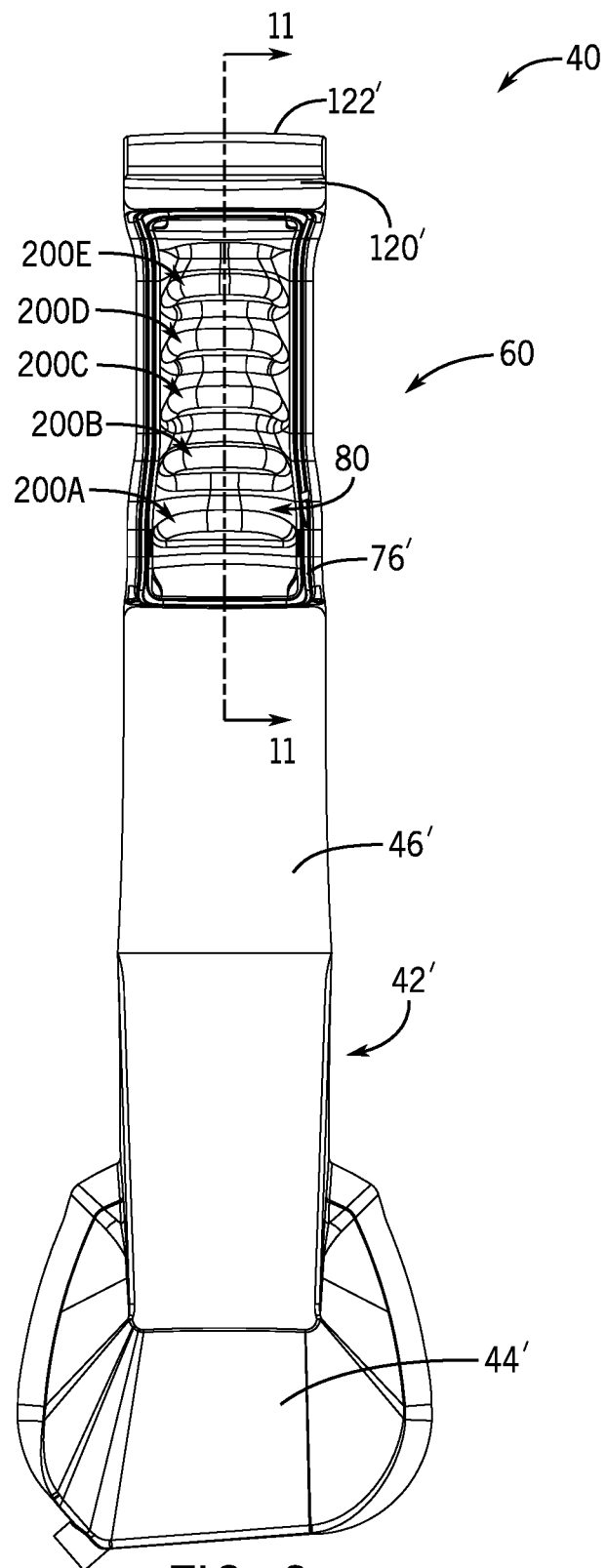
FIG. 9 is a front view thereof with the grille removed.
Figure 10:
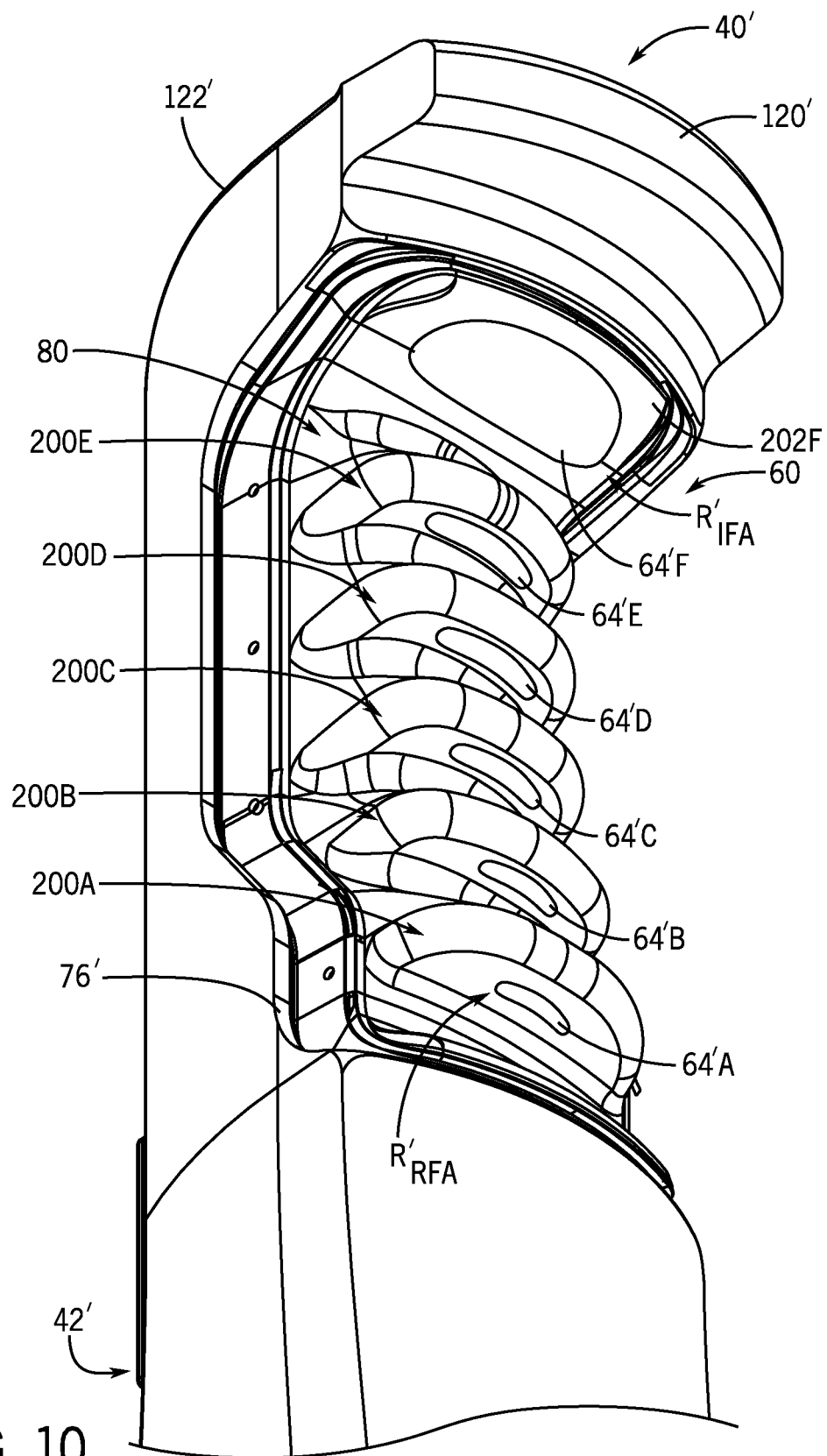
FIG. 10 is an enlarged partial perspective view thereof.

Referring also to FIGS. 4-6, in the illustrated example the partition 80 is configured such that the side walls 90, 91 that define the side periphery of the intake opening 64 are raised and contoured in a manner to reduce ingress of liquid or debris by shedding it outwardly away from the intake opening 64. As shown, the side walls 90, 91 each have a raised lip or deflector 110 that extends upstream from a wall 112 of the partition 80 that tends to physically interfere with liquid or debris following along the wall 112 of the partition 80 from entering the intake opening 64. Moreover, the side walls 90, 91 in the illustrated example are also configured with an inwardly sloped wall 116 that tends to guide or funnel the air flow into the intake opening 64, and thereby reduce the pressure drop across the intake opening 64, which further mitigates the formation of high screen velocity areas at the grille 62.

Liquid and debris ingestion into the engine air intake system 34 is mitigated by uniform screen velocity noted above and described in detail below. However, it is noted that the single, continuous intake opening 64 in the illustrated example provides a large unobstructed opening through which to aspirate the engine 26, and may be suited for high air flow requirement applications or low ambient liquid and debris applications. Still, ambient liquid ingestion is further mitigated by an overhead ledge 120 that overhangs the air intake 60 and a downwardly and rearwardly tapered upper wall 122 at the top of the housing 42 that tends to direct liquid falling from above toward the rear of the air intake tower 40 and away from the intake opening 64. Any liquid ingested by the air intake 60 may be evacuated actively (e.g., pumped) or passively (by gravity and/or air pressure) through a drain opening 130 (see FIG. 4) at the lower end 44 of the housing 42. In the illustrated example, the lower end 44 of the housing 42 forms a collection area or sump leading to the drain opening 130 to which liquid is fed passively by air pressure and/or gravity and drained passively by air pressure and/or gravity.

Referring now to FIGS. 7-11, another example air intake tower will now be described in which like elements will be given like reference numerals albeit with a prime suffix. Specifically, the air intake tower 40' has an elongated housing 42' defining an internal volume 43' (see FIG. 11) with a lower end 44' that is widened and flattened as it transitions from the main duct 46' of the housing 42' that has a generally square or rectangular cross-section to an outlet opening (not shown) that has a circular cross-section generally at a right-angle (perpendicular) to the cross-section of the main duct 46'. The outlet opening of the lower end of the housing 42' is mated with an inlet opening (not shown) of an air cleaner 48', such as described above, which is part of the engine air intake system 34 and communicates with an air inlet to the engine 26 (e.g., a suitable air intake manifold or the like). As described with the foregoing example embodiment, the air intake tower 40' is mounted to the air cleaner 48', which may take a lateral posture extending out from the engine compartment to a lateral side of the work vehicle 20 generally transverse to the direction of travel. The air intake tower 40' may take an upright posture extending generally vertically up from the engine compartment at a side of the work vehicle 20 with a distal end terminating near or above an upper part (e.g., roof of an operator cab) of the work vehicle 20. The housing 42' also has an overhead ledge 120' and a downwardly and rearwardly tapered upper wall 122' at the top of the housing 42' that tends to direct liquid falling from above toward the rear of the air intake tower 40' and away from the intake openings.

The upper end of the main duct 46' of the housing 42' defines an air intake 60' including a grille 62' situated upstream from the intake openings, as detailed below. As in the foregoing example, while the grille 62' may vary, the grille 62' is of molded resin construction having a generally U-shaped configuration defining a slightly bowed front face 70' flanked by inwardly (or downstream) extending opposite straight side walls 72', 73' and small angled top and bottom end walls 74', 75'. The various alternate constructions and manufacturing and assembly techniques described above are applicable here. The grille 62' is separate from the housing 42' and fit into a recessed peripheral area 76' of the air intake 60' where it is secured to the housing 42' by a plurality of rivets 78' spaced along and through the side walls 72', 73'.

The configuration of the air intake 60' and the grille 62' allows for ambient air to enter the engine air intake system 34 from multiple sides of the air intake tower 40', in particular, three sides, namely, the front and opposite sides of the air intake tower 40'. As detailed further below, the recessed intake opening 60', as well as the dynamics of the air flow, cause the air passing through the side walls 72', 73' of the grille 62' to flow into the volume of the internal chamber 100' behind the grille 62' where it mixes with air flowing through the front face 70' of the grille 62'. While the screen velocity profile may be generally consistent or similar at the side walls 72', 73' of the grille 62', even if not, the net screen velocity profile tends to distribute the air flow uniformly through the intake openings so as to inhibit concentrated areas of relatively high velocity.

As shown in FIG. 1, and mentioned briefly above, the air intake tower 40' may be situated in an upright orientation at one side of the work vehicle 20. In this mounting position, the front face 70' of the grille 62' faces laterally outward from a lateral side (e.g., the left side of the work vehicle 20 from the perspective of a forward-facing operator in the operator cabin), and the side walls 72', 73' face forward and rearward with respect to the work vehicle 20, and thus also the forward travel direction. It should be noted that the air intake tower 40' could be mounted in other orientations or locations relative to the work vehicle 20 or travel direction, and the air intake 60' could be oriented differently such that the front face 70' of the grille 62' is at a different side of the housing 42'.

In this example, there are multiple intake openings defined by a partition 80' that is generally recessed in the direction of air flow from the front face 70' of the grille 62'. The intake openings are recessed in the air flow direction from the side walls 72', 73' despite the partition 80' itself extending to, and possibly even abutting, the side walls 72', 73'. The partition 80' in the illustrated example is a unitary part of the housing 42' and thus formed of the same material and manufacturing process; however, the partition 80' may be a separate part assembled to the housing 42' by any of the aforementioned or other fastening devices or techniques.

In this example, the partition 80' has a louvered configuration in which multiple projections are tiered one above the other. Specifically, the partition 80' has five projections or louvers 200A-200E. Each louver 200A-200E projects toward the grille 62' (upstream) and is recessed back from the front face 70' of the grille 62'. Further, each louver 200A-200E is recessed back progressively farther from the front face 70' of the grille 62' from the bottom to the top of the air intake 60'. The louver 200A is nearest the front face 70' of the grille 62', and the louver 200E is the farthest from the front face 70' of the grille 62'.

Each louver 200A-200E has one or more intake openings. Each intake opening may be the same shape and flow area and in the same location with respect to the associated louver 200A-200E. In the illustrated example, the louvers 200A-200E progressively narrow in the side-to-side dimension from bottom to top, and each intake opening 64A'-64E' is located at an underside wall 202A-202E of the associate louver 200A-200E beneath a downwardly sloped wall 204A-204E thereof. Each underside wall 202A-202E has a slight upward cant in the upstream direction. In the illustrated example, each intake opening 64A'-64E' has a similar oblong curvilinear shape and extending primarily in the sideways direction. The intake openings 64A'-64E' may be identical and/or have the same flow area. However, in the illustrated example, the intake openings 64A'-64E' each have a different flow area, the smallest being the intake opening 64A' at the louver 200A and progressively enlarging to the intake opening 64E' at the uppermost louver 200E, that is, the side-to-side and front-to-back dimensions of the intake openings 64A'-64E' progressively increase from bottom to top of the air intake 60'. Further, an additional intake opening 64F', which may be a primary intake opening, is located in an underside wall 202F at an upper portion of the partition 80' that overhangs the louvers 200A-200E. The intake opening 64F' is wider and deeper than the other intake openings 64A'-64E' and defines the largest flow area, which alone may provide a larger flow area than one or more of the intake openings 64A-4E alone or combined. Due to the cant of the underside walls 202A-202F, the intake openings 64A'-64F' are three-dimensional openings in that their peripheries are each defined in terms of length (or height), width and depth. It is noted that that the quantity, configuration and absolute and relative recessed position of the louvers 200A-200E, as well as the quantity, configuration and position of the intake openings 64A'-64F' may vary from that in the illustrated example.

The configurations and flow areas of the intake openings 64A'-64F' create a region of reduced flow area $R'_{RFA}$ at the lower end of the air intake 60', which may be defined by a single one of the intake openings 64A'-64F', such as intake opening 64A', or a collective aggregate of the intake openings 64A'-64F', such as intake openings 64A' and 64B' combined. The configurations and flow areas of the intake openings 64A'-64F' also create a region of increased flow area $R'_{IFA}$ at the upper end of the air intake 60', which may be defined by a single one of the intake openings 64A'-64F', such as intake opening 64F', or a collective aggregate of the intake openings 64A'-64F', such as intake openings 64D'-64F' combined.

Being at the lower end of the air intake 60' and situated physically closer to the air cleaner 48' and thus to a region of relative low pressure $R'_{LP}$ within the engine air intake system 34 generally, and the internal volume 43' of the housing 42' of the air intake tower 40' specifically, the region of reduced flow area $R'_{RFA}$ is closer to the region of relative low pressure $R'_{LP}$ in the path of air entering the air intake 60' through the grille 62. Moreover, since the partition 80' is stepped back so that the lowermost louver 200A, and the intake opening 64A' is nearer the front face 70' of the grille 62' than the uppermost louver 200E, and the intake openings 64E' and 64F', the region of reduced flow area $R'_{RFA}$ is also upstream from the region of increased flow area $R'_{IFA}$.

Figure 11:
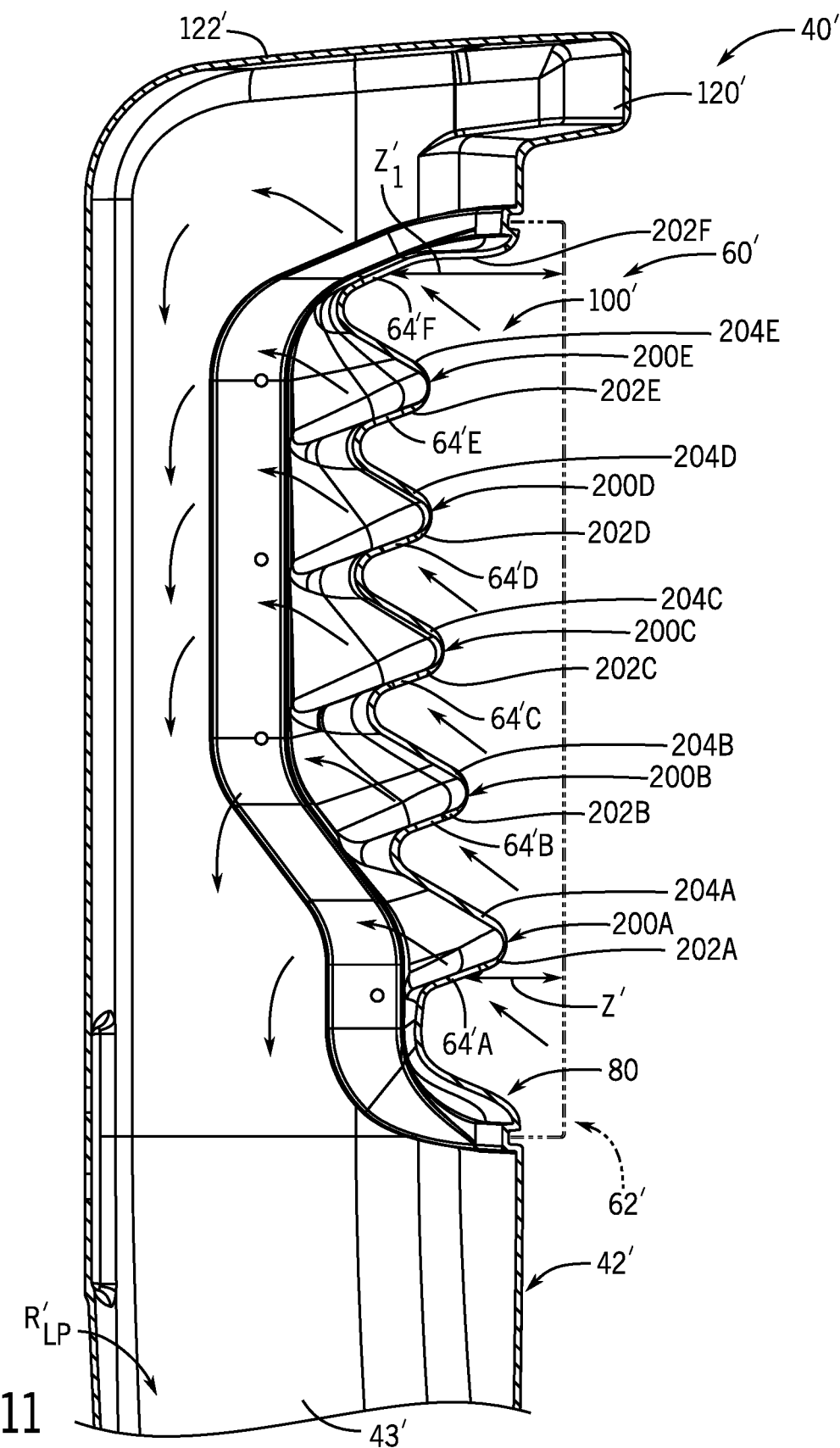
FIG. 11 is a side sectional view thereof take along plane 11-11 of FIG. 9.

As shown in FIG. 11, due to the progressively stepped or recessed louvered configuration of the partition 80', the louver 200E, and thus the intake opening 64E', are recessed or spaced farther from the front face 70' of the grille 62', at a front-to-back dimension $Z'_1$, than is the louver 200A, and intake opening 64A', which is spaced from the front face 70' of the grille 62' by a front-to-back dimension $Z'$, in which $Z'_1 > Z'$ by a ratio of about 2:1. The absolute and relative sizing of the intake openings 64A'-64F' as well as the slopes and recess spacings of the louvers 200A-200E may vary from that in the illustrated example.

As in the example embodiment of FIG. 2, this configuration tends to impart at least two characteristics to the air intake 60'. First, the farther setback from the front face 70' of the grille 62' of the region of increased flow area $R'_{IFA}$ creates an internal chamber 100' for a relatively large volume of air between (in the flow direction) the grille 62' and the intake openings associated with the region of increased flow area $R'_{IFA}$. Second, the region of reduced flow area $R'_{RFA}$, again which is nearer the region of relative low pressure $R'_{LP}$, and thus the shortest path, and otherwise the path of least resistance, through the air intake tower 40', causes a partial bottle-neck tending to inhibit some of the air from taking the shortest path but instead causing some of the air to flow to the internal chamber 100' from where the air flows into the intake openings associated with the region of increased flow area $R'_{IFA}$.

As noted above, the characteristics of the air intakes 60, 60' create a generally uniform air distribution profile (or uniform screen velocity) through the grille 62. By uniformly distributing air flow through the grille 62', the air intake 60' mitigates or avoids significant regions of relatively high screen velocity that would tend to cause ingress of unwanted liquid or debris into the engine air intake system 34. In the case of particulate matter, uniform screen velocity may also reduce or eliminate build-up of debris, and possibly clogging of openings, at associated areas of the grille 62', and thereby avoid the associated hampering of engine aspiration.

Figure 12:
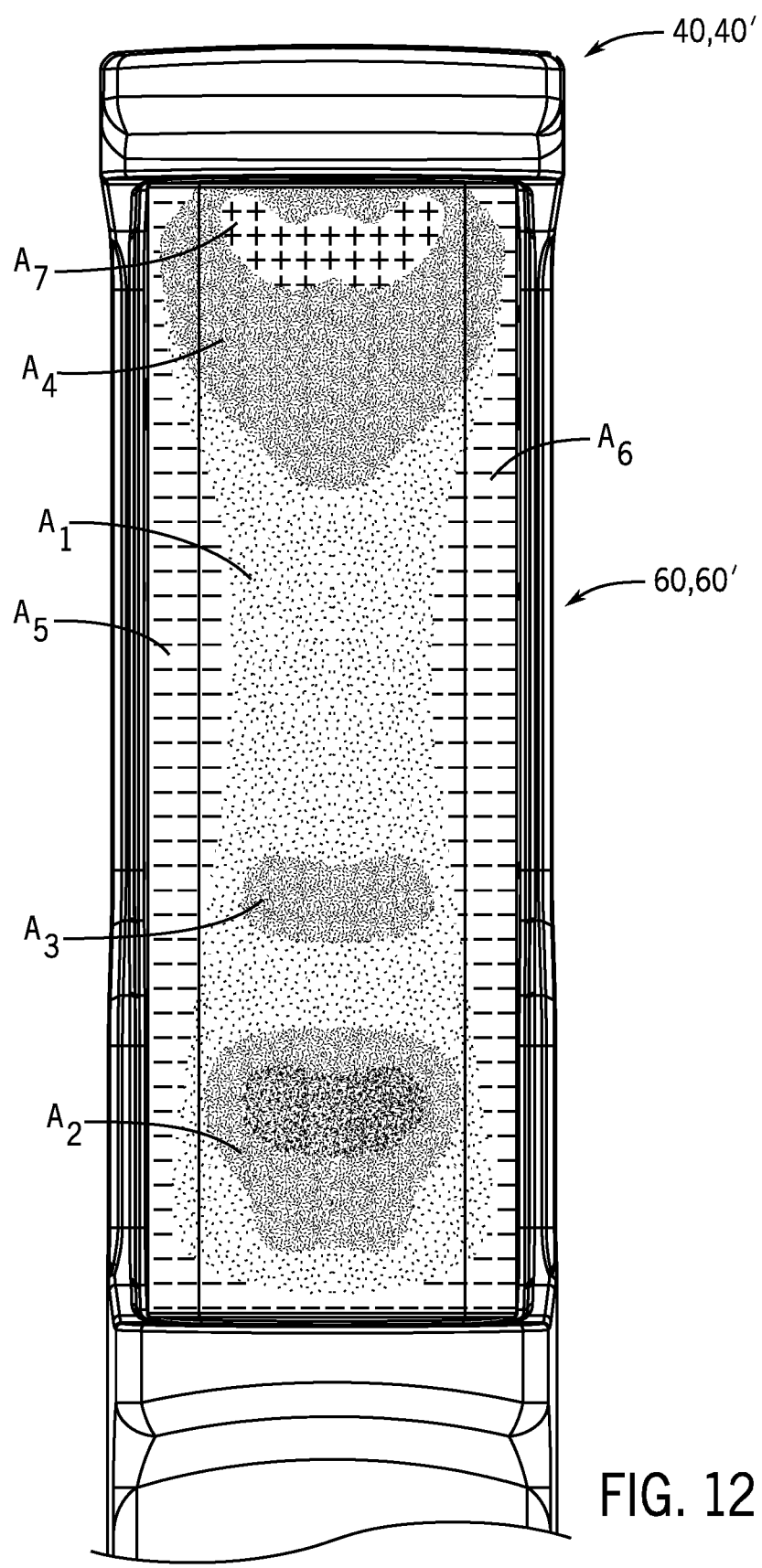
FIG. 12 is a front view showing an example screen velocity profile for the example air intake towers of FIGS. 2 and 7.

FIG. 12 provides an example screen velocity profile applicable to the foregoing example air intake towers 40, 40', which refers to the distribution of air flow through the air intakes 60, 60', which, again, is understood to be localized at the grille 62, 62' rather than the intake opening(s). The screen velocity profile is spread generally evenly along the front face 70, 70' of the grille 62, 62' from bottom to top and side to side, as indicated by the generally uniform density of the stippling in the FIG. 12. Areas of greater stipple density of the front face 70, 70' of the grille 62, 62', such as at areas $A_2$, $A_3$ and $A_4$, indicate a very slight increase in screen velocity, essentially the same as that of an average or general screen velocity of the grille 62, 62', such as at area $A_1$. Side areas $A_5$ and $A_6$ of reduced screen velocity are represented by minus sign symbols. A small upper region $A_7$ of slightly elevated screen velocity is represented by plus sign symbols. Notably, FIG. 12 reflects no significantly higher screen velocity at or near the lower end of the air intake 60, 60' closer to where the path of least resistance to the low pressure within the air intake tower 40, 40', as would normally be expected. It is also noted that FIG. 12 indicates that, because of the orientation of the intake openings 64, 64A'-64F' facing the front face 70, 70' of the grille 62, 62' would require air flowing through the sides walls 72, 72' and 73, 73' to turn (approximately 90 degrees), the shortest path (or path of least resistance) to the air intake 60, 60' is from the front face 70, 70' of the grille 62, 62. Thus, the effective air flow through the air intake 60, 60', and thus the screen velocity profile thereof, is governed by the screen velocity at the front face 70, 70' of the grille 62, 62'.

Enumerated Examples of the Air Intake Tower

The following examples of the cooling debris and mitigation system are further provided and numbered for ease of reference.

1. An intake tower for a work vehicle comprising: a grille having a front face; a duct defining an internal volume and an air intake having a periphery at which the grille is mounted, the air intake having a first end and a second end, the first end being closer to a region of relative low pressure within the internal volume of the duct than the second end; and a partition extending between the first and second ends of the air intake recessed from the front face of the grille, the partition defining one or more intake openings leading to the internal volume of the duct, the one or more openings, or portion of the one or more openings, defining a first flow area at the first end of the air intake and the one or more openings, or portion of the one or more openings, defining a second flow area at the second end of the air intake; the first flow area being lesser than the second flow area; and the one or more openings, or portion of the one or more openings, defining the first flow area being located nearer the front face of the grille than the one or more openings, or portion of the one or more openings, defining the second flow area.

2. The intake tower of example 1, wherein the first end of the air intake is a lower end of the air intake and the second end of the air intake is an upper end of the air intake.

3. The intake tower of example 1, wherein the partition is defined as a unitary part of the duct.

4. The intake tower of example 1, wherein the one or more openings is a single intake opening extending from the first end to the second end of the air intake; and wherein a first portion of the single intake opening defines the first flow area and a second portion of the single intake opening defines the second flow area.

5. The intake tower of example 4, wherein the partition defines side walls that flank the single intake opening and diverge in the direction of the first end to the second end of the air intake such that the first end of the single intake opening is narrower between the side walls than a second end of the single intake opening; and wherein the side walls diverge continuously from the first end to the second end of the single intake opening.

6. The intake tower of example 5, wherein the side walls have deflectors extending from the first end to the second end of the single intake opening, the deflectors having raised surfaces that angle away from the single intake opening.

7. The intake tower of example 1, wherein the one or more openings define multiple intake openings arranged from the first end to the second end of the air intake; and wherein the partition defines a plurality of louvers arranged in a column from the first end to the second end of the air intake, the plurality of louvers projecting toward the front face of the grille, each of the plurality of louvers having at least one of the multiple intake openings.

8. The intake tower of example 7, wherein the plurality of louvers include a first louver and a second louver, the first louver located proximate the first end of the air intake to a side of an upright reference plane nearer to the front face of the grille than a second louver located proximate the second end of the air intake.

9. The intake tower of example 8, wherein the plurality of louvers are progressively recessed away from the front face of the grille from the first louver to the second louver.

10. The intake tower of example 9, wherein the multiple intake openings include a primary intake opening disposed above the second louver, the primary intake opening defining a primary flow area that is greater than a flow area of each intake opening in the first and second louvers; and wherein the primary flow area is greater than a combined flow area of the intake openings of the first and second louvers.

11. An intake tower for a work vehicle comprising: a grille having a front face; a duct defining an internal volume and an air intake having a periphery at which the grille is mounted, the air intake having a lower end and an upper end, the lower end being closer to a region of relative low pressure within the internal volume of the duct than the upper end; and a partition extending between the lower and upper ends of the air intake recessed from the front face of the grille, the partition defining one or more intake openings leading to the internal volume of the duct, the one or more openings, or portion of the one or more openings, defining a lower flow area at the lower end of the air intake and the one or more openings, or portion of the one or more openings, defining an upper flow area at the upper end of the air intake; the lower flow area being lesser than the upper flow area; and the one or more openings, or portion of the one or more openings, defining the lower flow area being located nearer the front face of the grille than the one or more openings, or portion of the one or more openings, defining the upper flow area.

12. The intake tower of example 11, wherein the one or more openings is a single intake opening extending from the lower end of the grille to the upper end of the grille; and wherein a bottom of the single intake opening is located to a side of an upright reference plane nearer to the front face of the grille than a top of the single intake opening 13. The intake tower of example 12, wherein the partition defines side walls that flank the single intake opening and diverge in the direction of the lower end to the upper end of the grille such that the bottom of the single intake opening is narrower between the side walls than the top of the single intake opening.

14. The intake tower of claim 11, wherein the one or more openings define multiple intake openings arranged from the lower end to the upper end of the grille; wherein the partition defines a plurality of louvers arranged in a column between the lower end and the upper end of the grille, the plurality of louvers projecting toward the front face of the grille, each of the plurality of louvers having at least one of the multiple intake openings; and wherein the plurality of louvers includes a top louver and a bottom louver, the bottom louver located to a side of an upright reference plane nearer to the front face of the grille than the top louver.

15. The intake tower of claim 14, wherein the multiple intake openings include an upper intake opening disposed above the top louver, the upper intake opening defining an upper flow area that is greater than a flow area of each intake opening in the plurality of louvers.

CONCLUSION

There has thus been provided embodiments of engine air intakes for usage in conjunction with work vehicles, such as agricultural tractors and other work vehicles operated in debris-laden ambient environments. The various configurations of the air intake tower, such as described in the foregoing examples, facilitate a generally evenly distributed screen velocity profile tending to inhibit the ingestion of debris and liquid into the air intake, and, in turn, into upstream components of the engine air system, and ultimately the engine itself. This serves to inhibit certain combustion abnormalities and pooling of liquid in component housings and dampening of components as well as to inhibit accumulation of debris and eventual clogging of filters within the air system and the grille of the air intake tower. Various configurations of the air intake tower may have one or more features that physically impede the infiltration of liquid and debris into the engine air system and/or the air intake tower itself and degradation of air flow volume to the engine.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

The invention claimed is:

1. An intake tower for a work vehicle comprising:
   a grille having a front face;
   a duct defining an internal volume and an air intake having a periphery at which the grille is mounted, the air intake having a first end and a second end, the first end being closer to a region of relative low pressure within the internal volume of the duct than the second end; and
   a partition extending between the first and second ends of the air intake recessed from the front face of the grille, the partition having walls extending from the periphery of the duct inwardly into the internal volume, the walls of the partition circumscribing and defining one or more openings facing the grille and leading intake air to the internal volume of the duct, the one or more openings, or portion of the one or more openings, of the partition defining a first flow area at the first end of the air intake and the one or more openings, or portion of the one or more openings, of the partition defining a second flow area at the second end of the air intake;
   wherein the first flow area is less than the second flow area; and
   wherein the one or more openings, or portion of the one or more openings, of the partition defining the first flow area intersects the interior volume of the duct nearer the front face of the grille than the one or more openings, or portion of the one or more openings, of the partition defining the second flow area.

2. The intake tower of claim 1, wherein the partition is defined as a unitary part of the duct.

3. The intake tower of claim 1, wherein the one or more openings of the partition is a single intake opening extending from the first end to the second end of the air intake; and
   wherein a first portion of the single intake opening defines the first flow area and a second portion of the single intake opening defines the second flow area.

4. The intake tower of claim 3, wherein the walls of the partition include side walls that flank the single intake opening and diverge in the direction of the first end to the second end of the air intake such that the first end of the single intake opening is narrower between the side walls than a second end of the single intake opening.

5. The intake tower of claim 4, wherein the side walls diverge continuously from the first end to the second end of the single intake opening.

6. The intake tower of claim 4, wherein the side walls have deflectors extending from the first end to the second end of the single intake opening, the deflectors having raised surfaces that angle away from the single intake opening.

7. The intake tower of claim 1, wherein the one or more openings of the partition define multiple intake openings arranged from the first end to the second end of the air intake.

8. The intake tower of claim 7, wherein the walls of the partition define a plurality of louvers arranged in a column from the first end to the second end of the air intake, the plurality of louvers projecting toward the front face of the grille, each of the plurality of louvers having at least one of the multiple intake openings.

9. The intake tower of claim 8, wherein the plurality of louvers include a first louver and a second louver, the first louver is located proximate the first end of the air intake, the first louver is located nearer to the front face of the grille than the second louver located proximate the second end of the air intake.

10. The intake tower of claim 9, wherein the plurality of louvers are progressively recessed away from the front face of the grille from the first louver to the second louver.

11. The intake tower of claim 10, wherein the multiple intake openings include a primary intake opening disposed above the second louver, the primary intake opening defining a primary flow area that is greater than a flow area of each intake opening in the first and second louvers.

12. The intake tower of claim 11, wherein the primary flow area is greater than a combined flow area of the intake openings of the first and second louvers.

13. An intake tower for a work vehicle comprising:
    a grille having a front face;
    a duct defining an internal volume and an air intake having a periphery at which the grille is mounted, the air intake having a lower end and an upper end, the lower end being closer to a region of relative low pressure within the internal volume of the duct than the upper end; and
    a partition extending between the lower and upper ends of the air intake recessed from the front face of the grille, the partition having walls extending from the periphery of the duct inwardly into the internal volume, the walls of the partition circumscribing and defining one or more openings facing the grille and leading intake air to the internal volume of the duct, the one or more openings, or portion of the one or more openings, of the partition defining a lower flow area at the lower end of the air intake and the one or more openings, or portion of the one or more openings, of the partition defining an upper flow area at the upper end of the air intake;
    wherein the lower flow area is less than the upper flow area; and
    wherein the one or more openings, or portion of the one or more openings, of the partition defining the lower flow area intersects the internal volume of the duct nearer the front face of the grille than the one or more openings, or portion of the one or more openings, of the partition defining the upper flow area.

14. The intake tower of claim 13, wherein the partition is defined as a unitary part of the duct.

15. The intake tower of claim 13, wherein the one or more openings of the partition is a single intake opening extending from the lower end of the air intake to the upper end of the air intake; and
    wherein a bottom of the single intake opening is located nearer to the front face of the grille than a top of the single intake opening.

16. The intake tower of claim 15, wherein the walls of the partition include side walls that flank the single intake opening and diverge in the direction of the lower end to the upper end of the air intake such that the bottom of the single intake opening is narrower between the side walls than the top of the single intake opening.

17. The intake tower of claim 13, wherein the one or more openings of the partition define multiple intake openings arranged from the lower end to the upper end.

18. The intake tower of claim 17, wherein the walls of the partition define a plurality of louvers arranged in a column between the lower end and the upper end of the grille, the plurality of louvers projecting toward the front face of the grille, each of the plurality of louvers having at least one of the multiple intake openings; and wherein the plurality of louvers includes a top louver and a bottom louver, the bottom louver is located nearer to the front face of the grille than the top louver.

19. The intake tower of claim 18, wherein the multiple intake openings include an upper intake opening disposed above the top louver, the upper intake opening defining an upper flow area that is greater than a flow area of each intake opening in the plurality of louvers.

\* \* \* \* \*